Patented Apr. 30, 1940

2,199,026

UNITED STATES PATENT OFFICE 2,199,026

CHLORINATED AROMATIC RESINS

Arthur A. Levine and Oliver W. Cass, Niagara Falls, N. Y., assignors to E. I. du Pont de Nemours & Company, Wilmington, Del., a corporation of Delaware No Drawing. Application April 1, 1937,
Serial No. 134,384

13 Claims. (Cl. 260—74)

This invention relates to certain new and valuable resinous products which may be prepared by the chlorination of known resinous materials until there has been introduced a chlorine content falling within certain definite limits. The invention is also concerned with a new method by which known resinous materials are converted to products of greater value by chlorination under certain specified conditions. It may be said, more particularly, that the invention relates to the preparation of products of greater value and possessing novel and improved characteristics by chlorination of hydrocarbon resins of the type known as the dihydronaphthalene polymer type of resins.

We have found that the addition of chlorine to resins of the dihydronaphthalene type substantially changes the characteristics of the polymers so that resulting products of improved and superior characteristics, useful in various applications, are obtained. The products resulting from the chlorination of the hydrocarbon resins utilized as starting materials are generally darker in color, possess higher melting or softening points, possess superior non-inflammability, being for all practical purposes non-inflammable, and form more resistant films than unchlorinated hydrocarbon resins of the dihydronaphthalene type. Our resulting chlorinated products, of deeper color than the unchlorinated hydrocarbon polymers, can be decolorized only by severe treatment with chemical agents of exceptional activity.

Accordingly, it is one of the objects of this invention to prepare novel resinous materials of improved properties by the introduction of chlorine into certain hydrocarbon resins of the type known as the dihydronaphthalene type resins. Another object of this invention is the preparation of products having uniform and constant properties by the introduction of chlorine into hydrocarbon resins of the dihydronaphthalene type until there has been introduced an amount of chlorine falling within definite specified limits. Still another object of this invention is the securing of these valuable resinous products of considerably modified form by means of a process of chlorination which is rapid, efficient, and takes place without the maintenance of exceptional or unusual conditions as regards temperature, pressure, cooling, etc. These and still further objects of this invention will be apparent from the ensuing disclosure of a preferred method for securing our preferred novel products.

The resins which we utilize as the starting material for preparing our improved resinous products are those described and claimed in the co-pending application of Norman D. Scott and Joseph F. Walker, Serial No. 736,960, filed July 25, 1934. The resins of the dihydronaphthalene type disclosed in that application are polymers of dihydronaphthalene or other similar polycyclic aromatic hydrocarbons such as acenaphthene, or homologues of naphthalene such as methyl naphthalene. They are relatively low melting, somewhat brittle resinous products which, with suitable precautions, may be prepared in substantially colorless form and possessing slight fluorescence. They are hydrocarbon resins, i. e., presumably containing only hydrogen and carbon, although their exact chemical constitution has not been authoritatively determined.

One method described in the aforesaid Scott and Walker application for preparing resinous products which form the starting point from which we prepare valuable products of superior properties involves reacting an alkali metal with a polycyclic aromatic hydrocarbon in a suitable solvent ether. This procedure results in the alkali metal addition product of the hydrocarbon, which addition product remains in the solution. This solution is then reacted with water or an acid whereby the addition product is converted to the corresponding dihydro derivative of the hydrocarbon. When utilizing naphthalene and sodium, for example, the sodium addition product of naphthalene is converted to dihydronaphthalene, and by subjecting the resulting dihydronaphthalene compound to the action of a further quantity of the alkali metal addition product, the dihydro compound is polymerized with the formation of relatively low melting, somewhat brittle resinous materials. These resinous materials may be recovered by distilling off from the reaction mass the volatile constituents present therein. The entire process, including the reaction of the polycyclic aromatic hydrocarbon with the alkali metal, may be carried out in an inert atmosphere, such as in an atmosphere of nitrogen.

As an example of the Scott and Walker method for preparing the resinous polymers described, the following procedure may be considered as illustrative. It may be said that the dihydronaphthalene type polymer resulting from the procedure described in this example is the material which we have chlorinated, thereby securing valuable resinous materials. This polymer is a dihydronaphthalene polymer, i. e., prepared by starting with naphthalene as the hydrocarbon which is reacted, in suitable solvent ether solution, with an alkali metal such as sodium.

PREPARATION OF DIHYDRONAPHTHALENE TYPE POLYMERS

Utilizing an inert atmosphere of nitrogen gas one mole of naphthalene was reacted with one gram atom of sodium in diethylglycol ether as the solvent. This reaction was carried out at room temperature. After completion of the reaction, sufficient water was added to decolorize the solution. Precipitated sodium hydroxide was formed in the solution upon the addition of water and was thereafter removed by filtration.

The filtrate was then reacted, also under an atmosphere of nitrogen, with an additional gram atom of sodium. The resulting mixture was again hydrolyzed with water and again filtered to secure a clear filtrate. This clear filtrate was reacted once more with a further quantity of sodium and again hydrolyzed and filtered. The resulting clear filtrate was then distilled under reduced pressure, corresponding to from 1 to 3 mm. of mercury, until substantially all the volatile material contained therein had been distilled over. The residue, equivalent to 85% of the quantity of naphthalene originally taken, is a substantially colorless, transparent, slightly fluorescent solid, melting at about 100° C. and having a molecular weight of about 400. It is apparently a tetramer of dihydronaphthalene.

The product prepared by following the foregoing procedure has been termed "dihydronaphthalene polymer". Similar hydrocarbon polymers termed "dihydronaphthalene type polymers" may be prepared in accordance with this method by using other polycyclic aromatic hydrocarbons such as acenaphthene and/or homologues of naphthalene such as methyl naphthalene. Among the various solvent ethers suitable for reacting the hydrocarbons with sodium in accordance with this procedure may be mentioned diglycol methyl ether, methyl ethyl ether, various poly ethers such as the dialkyl glycol ethers and fully alkylated glycerols and cyclic ethers such as dioxane.

It is the resinous material prepared as described in the foregoing example in accordance with the general method disclosed in the copending application of Scott and Walker, Serial No. 736,960, that we utilize as the starting material for preparing our valuable new products. Throughout the specification and claims this resinous starting material will be hereafter referred to as "dihydronaphthalene polymer" or "dihydronaphthalene resin."

By the chlorination of this dihydronaphthalene polymer new bodies are produced of which the chemical constitution has not yet been definitely established. It may be stated, however, that the halogen introduced cannot be eliminated by saponification with alkalies without the use of some additional or further treatment. Since chlorinated substances of corresponding stability which resist attempts to change their color, halogen content, or chemical constitution are encountered in the case of but few polymers, the possibility of preparing valuable products by chlorinating the previously known dihydronaphthalene type resins, and the peculiar and valuable characteristics of the novel products thus secured, must be regarded as entirely surprising.

In chlorinating dihydronaphthalene type resins we have found it desirable to employ conditions suitable for the chlorination of the hydrogen atoms of the aromatic nuclei. This will involve, in general, providing some suitable halogenation catalyst or chlorine carrier such as iron, ferric chloride, antimony pentachloride, aluminum chloride, or iodine. Ordinarily, for commercial use iron or ferric chloride will be found most suitable because of their relative inexpensiveness. During the reaction light should be excluded from the reactants to as great an extent as possible, it being desirable, at least, to maintain the reaction vessel and its contents out of direct sunlight.

The process of chlorinating our resinous starting materials may be carried out either in a solvent or without the use of a solvent. When no solvent for the dihydronaphthalene polymer starting material is utilized, the temperature during the chlorination should preferably be such as to keep the reaction mixture in the liquid state. When a solvent is utilized the temperature should preferably be as low as possible and still keep the material in solution. Among suitable solvents may be mentioned carbon tetrachloride, chloroform, and methylene chloride.

Chlorine gas or some other suitable chlorination agent is next introduced. Any well known chlorination agent such as phosphorus pentachloride, antimony pentachloride, etc. may be utilized. We have found it advisable that the quantity of chlorine introduced should fall within certain definite limits and we have prepared products wherein the chlorine content has ranged from about 2 atoms of chlorine per naphthalene nucleus to about 3.75 atoms of chlorine per naphthalene nucleus. This means that the final products contain an amount of chlorine ranging from that equivalent to 8 atoms to that equivalent to about 15 atoms, when the initial starting material treated is the tetramer. As previously noted, the resin prepared in accordance with the foregoing procedure described in the Scott and Walker application is probably dihydronaphthalene tetramer. For products of greatest value we have found that the percentage of chlorine introduced should vary from about 35% to about 56%, based on the weight of the final product secured, these values corresponding respectively to the ranges from two chlorine atoms per naphthalene nucleus to 3.75 chlorine atoms per naphthalene nucleus.

The process of preparing our novel products, both with and without the utilization of a solvent for the dihydronaphthalene polymer starting material, will be apparent from the following examples:

*Example 1*

A one-liter flask was charged with 400 grams of dihydronaphthalene type polymer, specifically the polymer prepared in accordance with the procedure described above. Iron powder in the amount of 4 grams, as chlorine carrier or catalyst, was then added to the starting material. The flask was then immersed in an oil bath, shielded from the light, and its contents heated to a temperature of about 120° C.

Through an inlet pipe provided in the flask gaseous chlorine was introduced. A pipe was provided for effluent hydrogen chloride and from the amount of hydrogen chloride evolved it was possible to determine the quantity of chlorine introduced. As soon as chlorine was brought into contact with the dihydronaphthalene polymer the mixture turned jet black. By the time two atoms of chlorine per naphthalene nucleus had been introduced (corresponding to a chlorine content of about 35% based on the weight of the final chlorinated product) the melting point of the reaction mixture had risen to such an extent that a temperature of 230° C. was necessary to keep the mass sufficiently molten to permit stirring. Accordingly, chlorination was stopped at this point, there having been introduced approximately 71 grams of chlorine corresponding to two atoms of chlorine for every naphthalene nucleus.

The product was a brittle, jet black, porous mass. By dissolving it in suitable solvents and treating it in accordance with the usual film forming procedures, very resistant dark brown or black films resulted. These were distinctly more non-inflammable than the dihydronaphthalene resin starting material. The melting or softening point of the halogenated product was also considerably higher than that of the starting material, being in the neighborhood of 150 to 180° C.

Repetition of the foregoing procedure utilizing antimony pentachloride instead of ferric chloride as the catalyst or chlorine carrier gave substantially the same results. Here again the product was a brittle, jet black, porous mass containing about 35% of chlorine.

Example 2

390 grams of dihydronpahthalene resin was dissolved in 900 cc. of carbon tetrachloride and placed in a three-liter flask equipped with a chlorine inlet tube, thermometer, mercury seal stirrer, and reflux condenser. The reflux condenser led to a water scrubber which served to absorb the evolved hydrogen chloride.

Chlorine was introduced through the chlorine inlet tube, the flask and its contents being maintained in the dark and cooled to a temperature of about 0° C. by means of an ice bath. Previously 36 grams of antimony trichloride as a halogenation catalyst or chlorine carrier had been added to the solution.

When the evolution of hydrogen chloride through the reflux condenser ceased, the product was subjected to distillation in order to remove volatiles from the reaction mixture. At this time 1210 grams of chlorine had been passed into the reaction mixture and 505 grams of hydrogen chloride had been evolved. However all the chlorine used was not introduced into the reaction mass, as the effluent gases contained free chlorine.

After removing the carbon tetrachloride solvent and volatiles by distillation, a brown resinous product was obtained. The brown colored resin had a melting or softening point of 180°-200° C. The product formed films of a resistance much superior to that of films obtained with dihydronaphthalene type polymers when subjected to usual film-forming procedures.

From the amount of hydrogen chloride evolved it is evident that the chlorine content of the resulting product was 56.6%. This value corresponds to a chlorine introduction of about 3.75 atoms of chlorine per naphthalene nucleus.

When the resulting chlorinated resin, containing about 3.75 atoms of chlorine per naphthalene nucleus or a chlorine percentage of about 56.5%, was dried in an oven over night and mixed with unchlorinated dihydronaphthalene resin, a dark red brittle resinous product was obtained. This resin had a degree of non-inflammability superior to that of dihydronaphthalene resin alone, and could be treated in accordance with known methods involving the use of plasticizing, softening, coloring, and/or filling agents to secure valuable films, lacquers, insulating materials, wrapping sheets, molded and sprayed masses, and similar products.

Example 3

Dihydronaphthalene polymer in the amount of 260 grams was dissolved in 600 grams of methylene chloride solvent. Ten grams of ferric chloride were introduced and the flask placed in an ice bath. Chlorine gas was then permitted to flow into the flask through an inlet conduit especially provided therein. During the reaction, in order to reduce foaming and in order to speed up the process, an additional amount of methylene chloride in the amount of 250 grams, and ferric chloride as catalyst or chlorine carrier in the additional amount of 10 grams, were later introduced.

The process of chlorination was continued for approximately 19 hours, at the end of which period hydrogen chloride equivalent to a chlorine input of 3.1 to 3.2 atoms per naphthalene nucleus had been introduced. The amount of hydrogen chloride evolved was equivalent to 231 grams. The chlorine content of the product, about 49%, corresponded to about 3.2 atoms of chlorine per naphthalene nucleus. Since the dihydronaphthalene resin starting material prepared in accordance with the procedure described above was presumably the tetramer, there were introduced approximately 12.8 atoms of chlorine per mole of dihydronaphthalene polymer.

In order to secure the chlorinated resinous product the methylene chloride solvent was removed by distillation and the residue boiled with water. A light yellow powder was precipitated in the liquid. This yellow powder, the halogenated resin, containing approximately 3.2 atoms of chlorine per naphthalene nucleus, had a melting or softening point of 180°-210° C. When it was continuously melted and subjected to cooling a brittle, reddish brown resin was secured. This resin could not be decolorized by treatment with aqueous sodium hydroxide solution of concentration equivalent to a 1 normal solution of the base. When refluxed at 100° C. with caustic of this normality for four hours, there was no observable change in the concentration of the sodium hydroxide solution, nor was there any perceivable change in the color of the reddish brown resin. The films formed by this resin were very resistant, and could readily be prepared utilizing the usual plasticizing, softening, coloring, and/or filling agents. The surface of this film was smooth, hard and free from irregularities. It showed good adherence to the base to which it was secured, and could not be readily scratched or dented.

The new products are soluble in chlorohydrocarbons such as carbon tetrachloride and methylene chloride in aromatic hydrocarbons such as benzene and toluene, and in esters such as ethyl butyrate and butyl acetate with the formation of solutions of good viscosity. They are slightly soluble in acetone and are insoluble in alcohols, glycols, and in water. They are very resistant to the action of aqueous acids and alkalies, and the color is not noticeably affected thereby, even upon prolonged treatment at elevated temperatures.

When treated with the usual plasticizing, softening, coloring, and/or filling agents, our new chlorinated polymers yield resins having relatively hard surfaces which can be readily molded to produce a variety of resinous products. They form films which are odorless, tasteless, and have generally a very light amber color. These films are very smooth and hard, and adhere to practically all surfaces with very satisfactory adherence. Ordinarily they are brittle but can readily be plasticized in accordance with usual methods.

The softening points of our new halogenated products are in all instances over 150° C. They are substantially completely non-inflammable and, in this respect, as well as in their higher softening points, are far superior to the hydrocarbon resins from which they are produced.

It is obvious that our invention is not limited to the foregoing examples, nor to the specific details given therein. For example, the chlorination may be carried out in liquid media other than those mentioned, such as halogenated aliphatic, cyclic or aromatic hydrocarbons which do not react to any marked extent with chlorine under the conditions maintained during the halogenation of the naphthalene type polymer. It may be generally stated that better solubility and better mechanical strength of the halogenated products, coupled with greater non-inflammability and, in general, a higher softening point, can be secured by incorporating chlorine in amounts up to our higher limit, about 56%. Products of lower chlorine content, such as those of content as low as 35% are however also very satisfactory for various uses, and will in all cases possess properties much superior to those of the hydrocarbon resin from which they are produced. Products yielding films having various mechanical strengths, and products whose solubility in the various solvents mentioned varies from the solubility of other samples to a substantial degree, may be prepared by suitably selecting the percentage of chlorine introduced within the limits specified above.

These modifications and changes in the various details of producing the novel products and in the novel products themselves, as well as various other modifications, are to be considered as within the spirit of our invention and the scope of the appended claims. The invention is therefore to be restricted only as necessitated by the prior art or appended claims.

We claim:

1. A process for preparing valuable resinous products which comprises chlorinating a polymeric dihydro derivative of a hydrocarbon selected from the group consisting of naphthalene, naphthalene homologues, and acenaphthene.

2. A process for preparing valuable resinous products which comprises chlorinating dihydronaphthalene polymer.

3. A process for preparing valuable resinous products which comprises chlorinating dihydronaphthalene polymer until there have been introduced from 2 to 3.75 atoms of chlorine per naphthalene nucleus present in the starting material.

4. A process for preparing valuable resinous products which comprises chlorinating dihydronaphthalene polymer by passing chlorine into said polymer in the presence of a chlorine carrier.

5. A process for preparing valuable resinous products from dihydronaphthalene polymer which comprises chlorinating said polymer with chlorine in the presence of a chlorine carrier until there have been introduced from 2 to 3.75 atoms of chlorine per naphthalene nucleus present in said polymer.

6. A process for preparing valuable resinous products which comprises chlorinating a polymeric dihydro derivative of a hydrocarbon selected from the group consisting of naphthalene, naphthalene homologues, and acenaphthene dissolved in a suitable solvent by passing chlorine into said solution in the presence of a halogenation catalyst.

7. A process for preparing valuable resinous products from dihydronaphthalene polymer which comprises chlorinating said polymer dissolved in a suitable solvent by passing chlorine gas into said solution in the presence of a halogenation catalyst.

8. A process for preparing valuable resinous products from dihydronaphthalene polymer which comprises dissolving said polymer in a suitable solvent, passing chlorine into said solution in the presence of a chlorine carrier until from 2 to 3.75 atoms of chlorine per naphthalene nucleus present in said polymer have been introduced, and then distilling said solution to remove volatiles and to recover said desired halogenated resinous product.

9. Chlorinated polymers of dihydro derivatives of hydrocarbons selected from the group consisting of naphthalene, naphthalene homologues, and acenaphthene.

10. Chlorinated dihydronaphthalene polymer.

11. Chlorinated dihydronaphthalene polymer having a chlorine content ranging from 35 to 56% by weight.

12. A chlorinated dihydronaphthalene polymer which is soluble in aromatic hydrocarbons such as benzene and toluene and in chlorinated hydrocarbons such as carbon tetrachloride and methylene chloride, and in esters such as ethyl butyrate and butyl acetate, and which is substantially non-inflammable and has a softening point in excess of 150° C.

13. A chlorinated dihydronaphthalene resin containing from 35 to 56% chlorine by weight, said product being slightly soluble in acetone; insoluble in alcohols, glycols, and in water; soluble in carbon tetrachloride, methylene chloride, benzene, toluene, ethyl butyrate and butyl acetate; resistant to the action of dilute aqueous acids and alkalies; substantially non-inflammable, possessing a softening point of 150° C. or over; and forming odorless, tasteless, smooth films of satisfactory adherence.

ARTHUR A. LEVINE.
OLIVER W. CASS.